July 30, 1946. R. CHILTON 2,404,828
VALVE MECHANISM
Filed Aug. 25, 1942 4 Sheets-Sheet 4
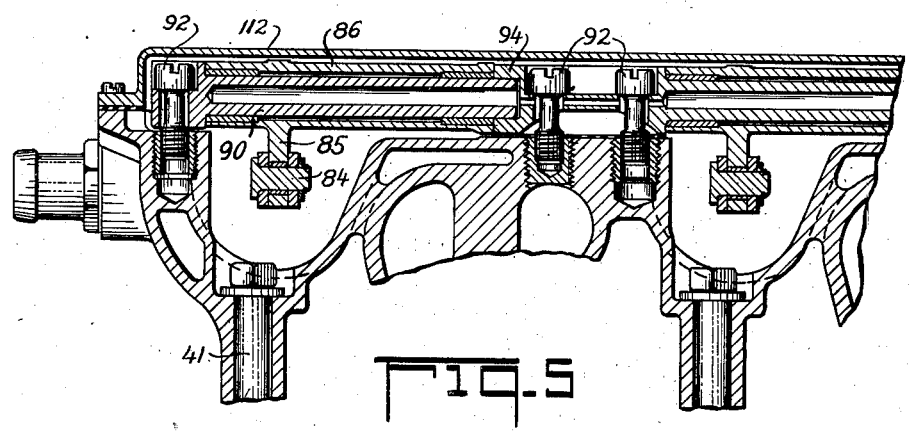
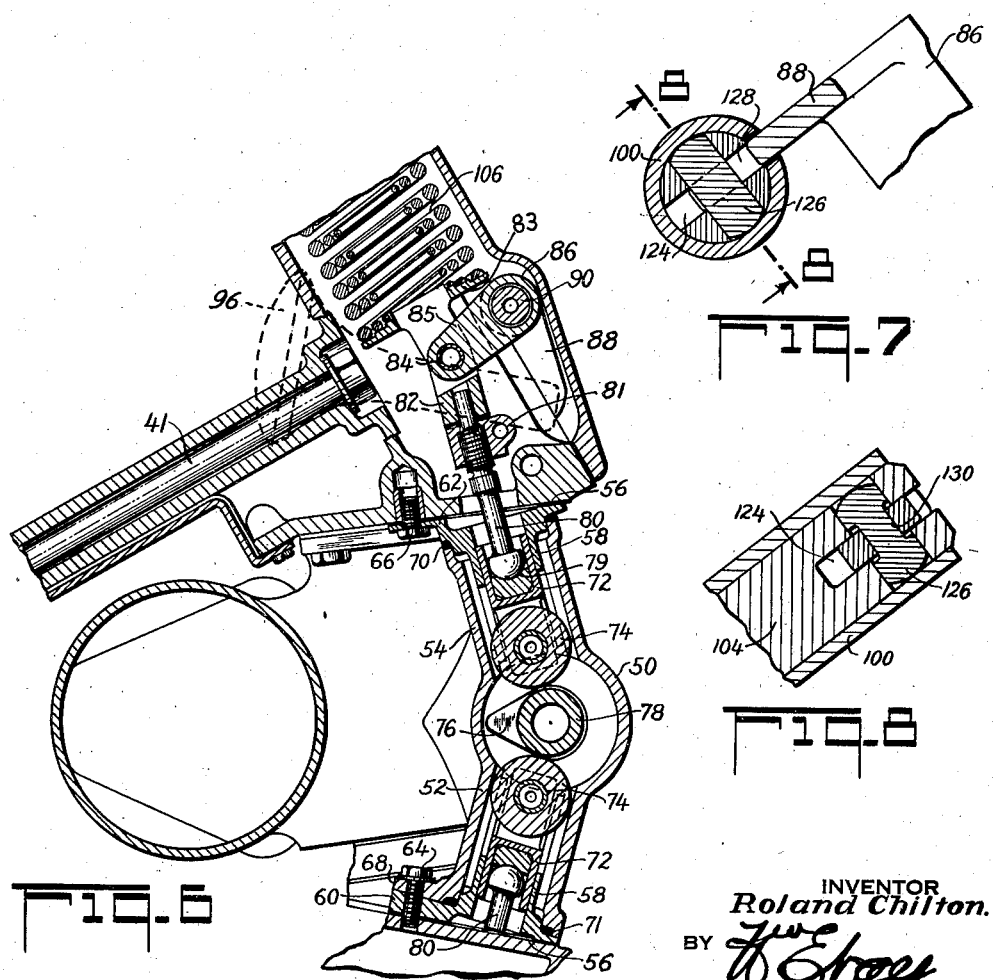
INVENTOR
Roland Chilton.
BY
ATTORNEY Patented July 30, 1946

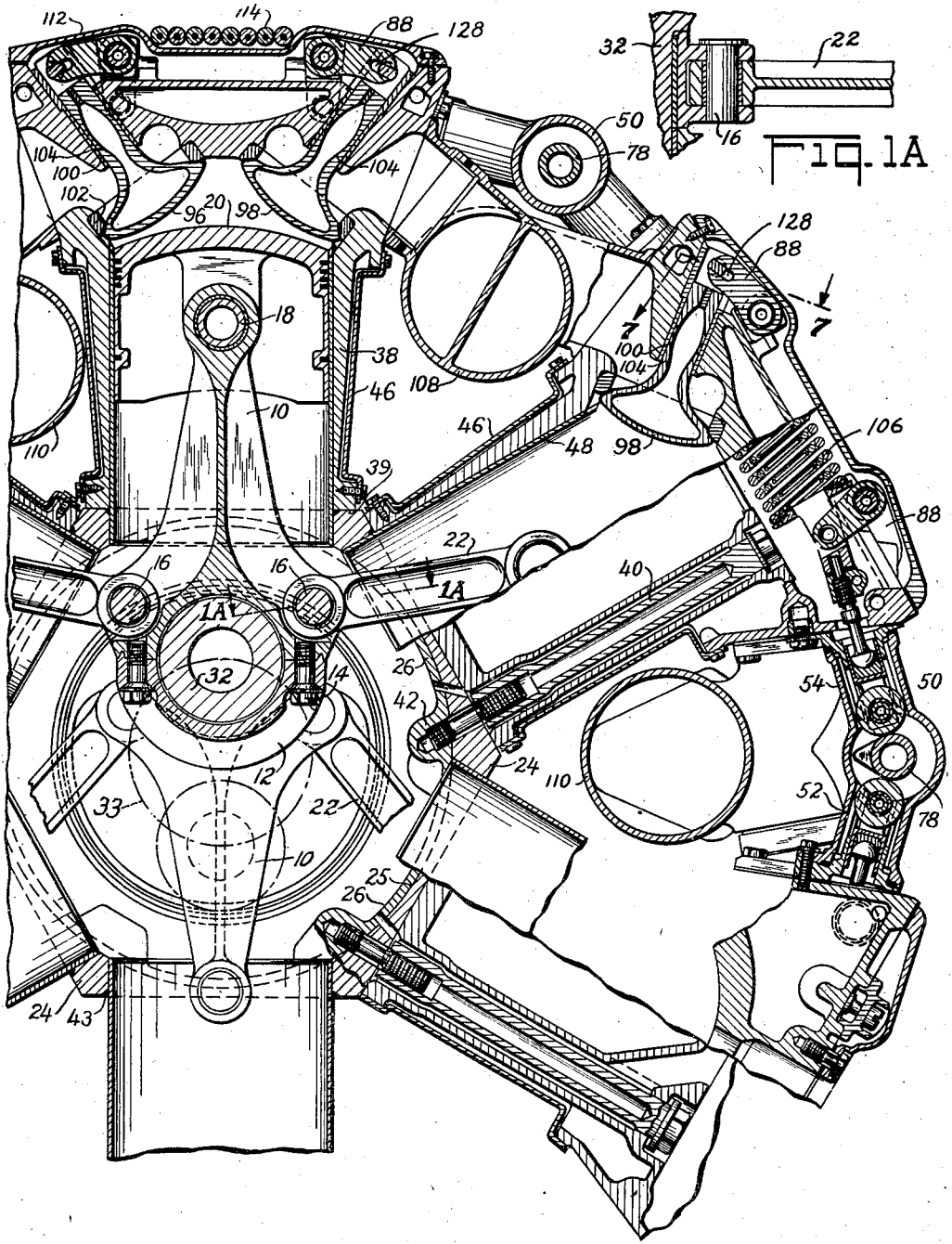

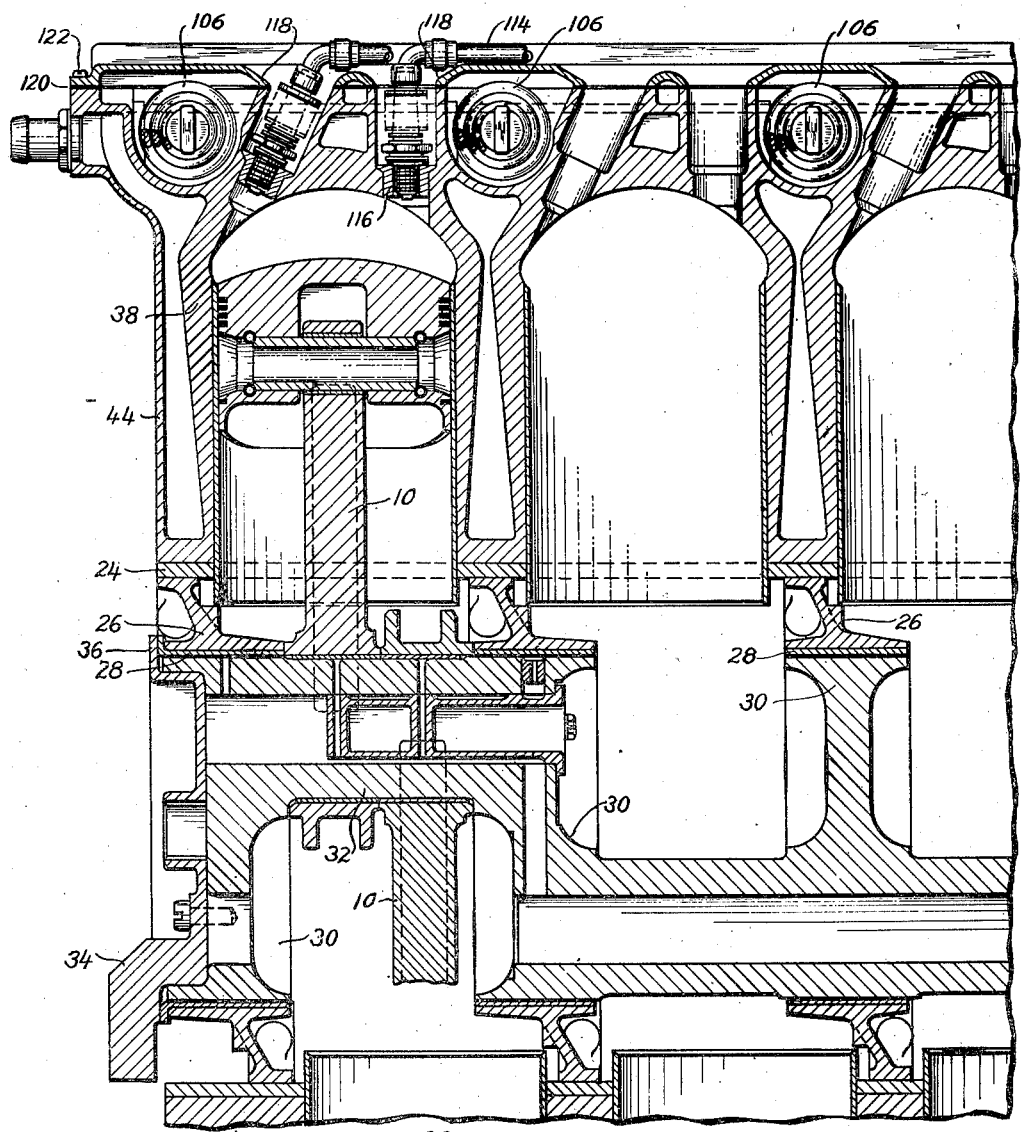
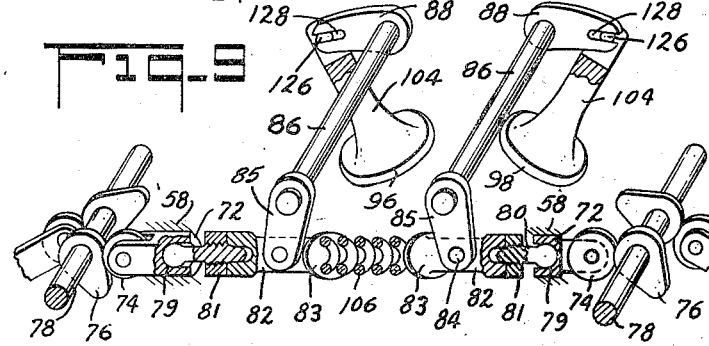

2,404,828

UNITED STATES PATENT OFFICE 2,404,828

VALVE MECHANISM

Roland Chilton, Ridgewood, N. J., assignor to Wright Aeronautical Corporation, a corporation of New York Application August 25, 1942, Serial No. 456,295

8 Claims. (Cl. 123—90)

1

This invention relates to engines and particularly to aircraft engines wherein minimum weight and bulk are of prime importance.

One object of the invention is to provide an improved general disposition of the main elements of the engine power section providing a maximum of gross piston area or displacement within minimum external dimensions. To this end, the invention features a special "low" valve gear mechanism affording relatively great valve area compared to the height above the combustion chamber occupied by the valve gear.

A further object of the invention is to provide a multi-cylinder engine having a new arrangement of connecting rods, crankcase and crankshaft whereby economies in weight and bulk are combined with adequate strength and simplified fabrication.

Still another object of this invention is to provide a cylindrical deck type crankcase for a radial engine thereby providing a simpler and more economical crankcase construction.

Further objects of this invention will become apparent in reading the annexed detailed description in connection with the drawings, in which:

Fig. 1 is a radial section through the engine;

Fig. 1A is a sectional view along line 1A—1A of Figure 1.

Fig. 2 is an axial section through a bank of cylinders;

Fig. 5 is a section on the line 5—5 of Fig. 3;

Fig. 6 is an enlarged sectional view of a portion of Fig. 1;

Fig. 7 is a section on the line 7—7 of Fig. 1;

Fig. 8 is a section on the line 8—8 of Fig. 7; and

Fig. 9 is a diagrammatic perspective view illustrating the valve gear for the valves of one cylinder.

Figure 3:
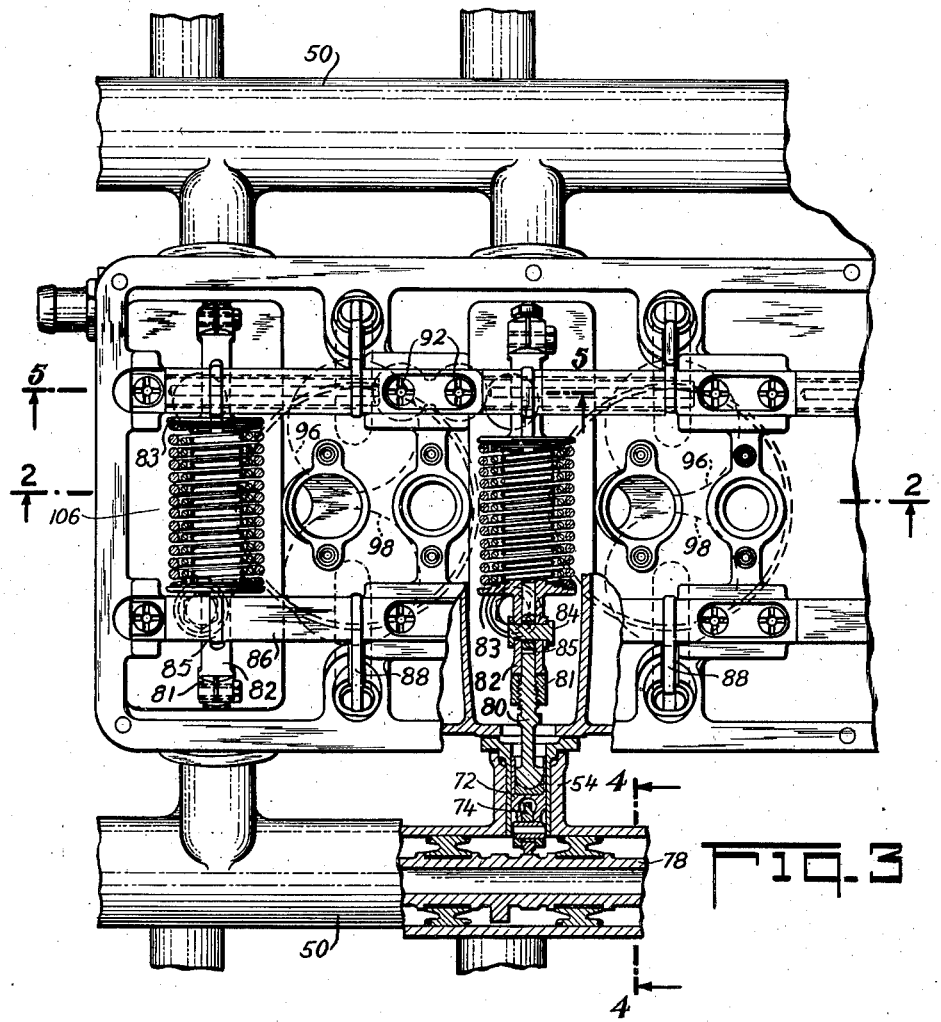
Fig. 3 is a top plan view along a bank of cylinders with the valve gear cover removed and with a portion of the bank broken away.
Figure 4:
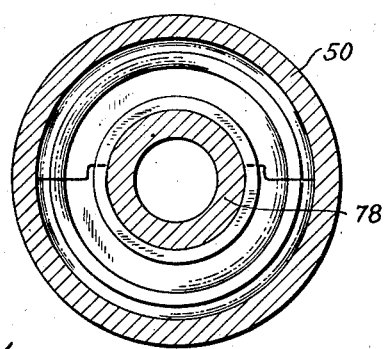
Fig. 4 is a section on the line 4—4 of Fig. 3.

In the following description, the term "row" of cylinders is used to define a plurality of cylinders arranged radially around a common crankpin and the term "bank" denotes a plurality of cylinders alined axially of the crankshaft and individually cooperating with respective crankpins thereon. The number of rows of radial cylinders, i. e., the number of cylinders per bank is selected according to the power requirements but an even number of cylinders, and preferably six, is utilized for the individual radial rows in order

2 to realize advantages flowing from an improved connecting rod disposition.

Two similar connecting rod groups or assemblies are disposed side by side on each crankpin, each group comprising a master rod 10, having a detachable cap 12 secured by screws 14 and provided with two knuckle pins 16 seated in the main body of the rod, the cap half being free of knuckle pins. Articulated on each knuckle pin is a link rod 22 engaging a piston pin 18 of the respective pistons 20. It will be seen that the pistons of the three upper cylinders are thus served by one rod assembly and the three lower cylinders by the other, these two groups of cylinders being offset axially to correspond to the offset of the side-by-side rods upon the crankpin.

It is well known that one of the prime limitations on engine diameter is the connecting rod length necessary to avoid excessive rod angularity and that, for a given maximum rod angularity and in a connecting rod assembly comprising a master rod with link rods articulated thereto, the length required for the link rods is greatest for those engaging knuckle pins most remote from the master rod axis. In this invention, only two knuckle pins are used, and these, being adjacent to the master rod, require only a minimum length of link rod to keep within the prescribed angularity limits. Such three-way articulated rods are individually old in the art, but their disposition side by side on a common crankpin in a 6-cylinder radial disposition is new as far as I am aware. It is also old to use two oppositely disposed coplanar master rods of the so-called straddle type where one master rod embraces and articulates upon the crankpin-bearing of the other, but such arrangements result in dissimilar master rods wherein it is difficult to achieve the desired rigidity without undue bulk and weight. Also, bearing troubles have resulted in the use of these oppositely disposed coplanar master rods wherein one master rod bearing is wrapped around the other.

The detachable cap feature of the simple and identical three-way rods of this invention permits the use of a one-piece crankcase and a one-piece crankshaft. The crankcase 24 consists of a single unitary tubular member having a circular bore 25 into which bearing diaphragms 26 are shrunk and preferably brazed. These bearing diaphragms have large bore bearings 28 supporting disc type journals 30 of a one-piece crankshaft having crankpins 32. In Fig. 1 the dot-and-dash line 33 indicates the path of travel of the center of the crankpin 32. Counterweight members 34 having end location flanges 36 are secured to each end of the crankshaft. It will be seen that by detaching one of these counterweight members and the connecting rods, the crankshaft may be disassembled axially through the bearings 28. This construction affords a virtually one-piece crankcase which is more rigid and lighter than the conventional split crankcase involving bolted joints.

Each cylinder bank comprises a unitary block 38 secured to flat decks 39 of the polygonal crankcase 24 by through bolts 40 threaded into tapped bosses 42 in the bearing diaphragms 26, whereby these are further secured and rigidified with the crankcase 24. Figs. 5 and 6 disclose a modified type of bolt 41. The edges of the crankcase cylinder openings are chamfered for the reception of a soft gasket seal 43. The cylinders of each bank are enclosed in a water jacket 44 closed by cover plates 46 and each cylinder bore is provided with a shrunk-in lining 48.

The special low valve gear of this invention comprises cam shaft housings 50 disposed between each bank of cylinders and having tappet guide bosses 52 and 54 extending towards the cylinder block port faces 56. Tappet guides 58 having flanges 60 and 62 are fitted in the camshaft housing bosses 52 and 54, the assembly being secured to the cylinder faces 56 by cap screws 64 and 66. To compensate for manufacturing and expansion variations in the camshaft housings 50 and the cylinder blocks 44, a feature of the invention provides that, on one side, the cap screws 64 clamp flanges 68 of the camshaft housings 50 and the flanges 60 of the tappets 58 to the associated cylinder block whereas, on the other side, the cap screws 66 clamp only the flanges 62 of the tappet guides 58 to the opposite cylinder block. The valve gear assembly is sealed against oil leakage by rubber rings 70 and 71. Ring 70 also permits axial self-adjustment of the tappet guide 58 in the camshaft housing boss 54 while the companion tappet boss 52 is secured rigidly to the associated cylinder block.

Slidable axially in the tappet guides 58 are short tappets 72 having rollers 74 engaging cams 76 on camshafts 78. Engaged in sockets 79 in each tappet 72 are ball-ended push rods 80 having nuts 81 adjustably secured thereto for abutting engagement with clevises 82 formed integral with valve spring seats 83. Each clevis 82 is provided with a pin 84 engaging a lever 85 depending from a tubular hub 86 extending axially of the cylinder block to a valve actuating lever 88 formed integral with said hub 86. The levers 85 and 88 and tubular hubs 86 comprise rockers mounted on fulcrum pins 90 secured to the cylinder block by cap screws 92 engaging suitable heads integral with the fulcrum pins 90. As shown in Fig. 5 the heads of intermediate fulcrum pins are provided with bosses 94 each bored to receive the free end of the adjacent fulcrum pin.

The inlet and exhaust valves 96 and 98 respectively, are mounted in valve guides 100 and engage conventional valve seats 102. The valves have stems 104 engaging the rocker arms 88 through push-pull connections later to be described. By referring to Figs. 3 and 9, it will be seen that the valve spring seats 83 of the inlet and exhaust push rods of the valves of any one cylinder are opposed to each other and between these seats are inserted the valve spring clusters 106.

Next it will be seen that when any valve opens, the associated valve spring seat 83 moves towards the center line of the cylinder block compressing the common valve spring which, accordingly, serves to return each valve of any pair to its seat. The length of the rocker arm hubs 86 is such that the center line of the valve spring is disposed towards the rear of the associated combustion chamber whereby the bottom of the valve spring is actually below the top of the combustion chamber as best seen in Figure 2. This affords great saving in height and engine diameter compared to the conventional arrangement where the valve springs are disposed axially around a length of valve stem extending outwardly beyond the valve ports.

Inwardly of camshaft housings 50, in alternate intercylinder V's, are three inlet manifolds 108 and three exhaust manifolds 110. In this connection it should be noted that the inlet ports of adjacent cylinders face each other and that the exhaust ports of adjacent cylinders face each other. As a result of this arrangement, each of the inlet and exhaust manifolds accommodates the cylinders of two adjacent banks. Also, a detachable cover plate 112 covers the entire valve gear and has a depression in which are accommodated the ignition cables 114 serving the spark plugs 116. The valve cover 112 is provided with suitable openings 118 to accommodate the spark plugs, the whole being sealed by a gasket 120 and screws 122.

A push-pull connection is provided between each of the valve stems 104 and rocker arms 88. Referring to Figs. 1, 7 and 8, the upper end of each valve stem is slotted at 124 to form a forked upper end. A cross pin 126 extends across this slot and is journaled in each side of the fork formed thereby. A slot 128 is provided in the end of each valve actuating rocker arm which slot engages a flat portion 130 on cross pin 126 to provide a push-pull connection therebetween.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine, in combination, adjacent cylinder banks, a camshaft housing therebetween having tappet guide bosses on either side, and tappet guides fitted in said bosses and having flanges secured to respective cylinder blocks, the bosses on one side only of said housing having flanges incorporated in the associated tappet flange securement.

2. In an engine, in combination, a pair of adjacent cylinder banks, tappet guides secured to respective banks, tappets in said guides, a camshaft engaging said tappets, and a camshaft housing having bosses on each side engaging respective tappet guides, one said engagement being rigid with the associated guides and bank and the other engagement being telescopic.

3. A valve gear for a bank of cylinders wherein each cylinder has a pair of valves, a pair of rocker members for each cylinder each having a valve actuating arm and an arm depending toward the associated cylinder, a valve spring seat pivotally connected to each of said depending arms, and a valve spring disposed between each pair of spring seats for urging the associated pair of valves in a closing direction, a push rod engageable with each valve spring seat and extending transversely beyond the cylinder bank and cam shaft means disposed adjacent said cylinder bank for operation of said push rods.

4. In an engine having a plurality of radially disposed cylinder banks, a pair of valves for each cylinder, a pair of rocker members for each cylinder, each respectively being adapted to operate one of the valves of the associated cylinder, a valve spring for each pair of cylinder valves operatively connected to a pair of rocker members for urging both associated cylinder valves in a closing direction, and a plurality of cam shafts each respectively disposed between a pair of adjacent cylinder banks, the rocker members of each pair respectively being operatively connected to the cam shafts disposed along opposite sides of the associated cylinder bank.

5. In an engine having a plurality of radially disposed cylinder banks, a pair of valves for each cylinder, a pair of valve operating rocker members for each cylinder disposed adjacent opposite sides of the associated cylinder bank, each rocker member having first and second arms, the first arms of each pair of rocker members respectively being adapted to operate one of the valves of the associated cylinder, a valve spring for each pair of cylinder valves, each of said valve springs being disposed between the second arms of a pair of rocker members for urging both associated cylinder valves in a closing direction, and a plurality of cam shafts each respectively disposed between a pair of adjacent cylinder banks, each of said cam shafts being operatively connected to the second arms of the rocker members disposed along the adjacent cylinder bank sides.

6. In an engine having a plurality of radially disposed cylinder banks, a pair of valves for each cylinder, a pair of valve operating rocker members for each cylinder disposed adjacent opposite sides of the assoicated cylinder bank, each rocker member comprising a hub portion and having axially spaced first and second arms extending therefrom, the first arms of each pair of rocker members respectively being adapted to operate one of the valves of the associated cylinder, a valve spring for each pair of cylinder valves disposed transverse to the associated cylinder bank and between adjacent cylinders, each of said valve springs being disposed between the second arms of a pair of rocker members for urging both associated cylinder valves in a closing direction, and a plurality of cam shafts each respectively disposed between a pair of adjacent cylinder banks, each of said cam shafts being operatively connected to the second arms of the rocker members disposed along the adjacent cylinder bank sides.

7. In an engine having a row of radially-disposed cylinders, each cylinder having a pair of valves, cam means disposed between each pair of adjacent cylinders, a pair of push rods extending substantially oppositely from each cam means for operation thereby, each of the push rods of a pair being operatively connected to one of the valves of the cylinders adjacent the associated cam means, and a valve spring for each cylinder for urging both cylinder valves in a closing direction.

8. In an engine having a plurality of radially-disposed cylinder banks forming substantially V-shaped inter-cylinder bank spaces and providing a plurality of rows of radially-disposed cylinders, a pair of valves for each cylinder, a cam shaft disposed in each inter-cylinder bank space, a plurality of pairs of substantially oppositely extending push rods adapted to be operated by said cam shafts, each pair of push rods being operatively connected to one valve of each cylinder of a pair of adjacent cylinders in a cylinder row, and a valve spring for each cylinder for urging both cylinder valves in a closing direction.

ROLAND CHILTON.